United States Patent [19]

Ogawa et al.

[11] Patent Number: 4,861,809

[45] Date of Patent: Aug. 29, 1989

[54] FRICTION MATERIAL

[75] Inventors: Hiroyasu Ogawa; Kenji Shimazaki; Kenji Niijima, all of Shizuoka, Japan

[73] Assignee: Toho Rayon Co., Ltd., Tokyo, Japan

[21] Appl. No.: 199,825

[22] Filed: May 27, 1988

[30] Foreign Application Priority Data

May 29, 1987 [JP] Japan ................................. 62-134168
Aug. 13, 1987 [JP] Japan ................................. 62-202518

[51] Int. Cl.$^4$ ............................ C08K 7/06; C08J 5/14
[52] U.S. Cl. .................................... 523/149; 523/152; 523/153; 523/155; 523/156; 523/157; 523/158; 523/215; 523/468; 524/495
[58] Field of Search ................. 523/149, 152, 153, 155, 523/156, 157, 158, 468, 215; 524/495

[56] References Cited

U.S. PATENT DOCUMENTS

| 3,723,607 | 3/1973 | Kalnin | 523/215 |
| 3,772,429 | 11/1973 | Basche et al. | 523/215 |
| 4,019,912 | 4/1977 | Augustin | 106/36 |

FOREIGN PATENT DOCUMENTS

| 2144367 | 3/1973 | Fed. Rep. of Germany . |
| 2166352 | 11/1973 | Fed. Rep. of Germany . |
| 2926616 | 1/1980 | Fed. Rep. of Germany . |

Primary Examiner—Lewis T. Jacobs
Attorney, Agent, or Firm—Sughrue, Mion, Zinn, Macpeak & Seas

[57] ABSTRACT

A friction material containing from about 0.5–29 wt % of carbonaceous fibers with a bond nitrogen content of from about 14 to 21 wt %, an auxiliary material and a thermosetting resin. The material has good wear and temperature resistance characteristics and can be used in power transmissions and brakes.

20 Claims, No Drawings

FRICTION MATERIAL

FIELD OF THE INVENTION

The present invention relates to a friction material useful in power transmission and braking in automobiles and other vehicles.

BACKGROUND OF THE INVENTION

Asbestos has conventionally been used as principal reinforcements for friction materials after being shaped and cured together with thermosetting resins and auxiliary reinforcements. However, asbestos, which is a carcinogenic substance presents safety and health problems during both manufacture and use. Under these circumstances, demand has increased for non-asbestos friction materials. Friction materials generally are required to have friction coefficients of from 0.3 to 0.5 and to ensure high wear resistance and mechanical strength at temperatures of about 500° C.

A variety of fibrous materials have been used as non-asbestos materials. For example, Japanese Pat. Application (OPI) No. 113641/1983 (U.S. Pat. No. 4,259,397) discloses the use of preoxidized fibers produced by heat-treating acrylic (PAN) fibers at from about 200° to 400° C. in air (the term "OPI" as used herein refers to a "published unexamined Japanese patent application"). However, the preoxidized fibers with a tensile strength of from about 1 to 3 g/d and a tensile modulus of elasticity of from about 50 to 150 g/d are not satisfactory as fibrous reinforcement materials. In particular, the fibers are appreciably low in tensile modulus of elasticity as compared with asbestos. In addition, the weight of the fibers reduces at about 500° C. which is the temperature that should be withstood by friction materials, and the fibers have a tendency to form cracks in the surface of the friction material due to effluent gas and shrinking in volume of the fibers.

The use of carbon fibers derived from PAN, as fibrous reinforcement materials has also been disclosed, for example, in Japanese Patent Application (OPI) Nos. 9660/80 and 9659/80 (U.S. Pat. No. 4,259,397). The carbon fibers are usually produced by calcining preoxidized fiber at 1,000° C. or higher in an inert gas to obtain fibers having a carbon content of at least 90 wt % and a bond nitrogen content of from about 1 to 8 wt %, and they typically exhibit a tensile strength of at least about 13 g/d, a tensile modulus of elasticity of from about 1,400 to 1,800 g/d and an electric specific resistance of no more than about 0.01 Ωcm. However, when they are used as reinforcement for friction materials, the carbon fibers provide low friction coefficients, which is disadvantageous in the properties required in braking and power transmission. The carbon fibers also have the disadvantage that their high heat conductivity causes increased heat transfer to the support of a friction material or the mating member (usually made of a metal), thereby impairing the mechanical characteristics of the mating member.

Recently, an attempt has been made to use carbon fibers derived from pitch as fibrous reinforcement materials. These carbon fibers have a tensile strength of from about 2 to 6 g/d and a tensile modulus of elasticity of from about 200 to 300 g/d. In addition to their low performance and poor characteristics as reinforcement materials, these carbon fibers suffer from the disadvantage of low adhesion to molding resins.

SUMMARY OF THE INVENTION

An object of the present invention is to provide a friction material having a suitable friction coefficient (generally from about 0.3 to 0.45) and high wear resistance.

Another object of the present invention is to provide a friction material having a low weight reduction at a higher temperature and a low heat conductivity.

It is a further object of the invention to provide a friction material which does not contain asbestos.

As a result of intensive studies, it has now been found that these and other object of the present invention can be attained by a friction material containing from about 0.5 to 29 wt % (based on the total weight of the friction material) of carbonaceous fibers with a bond nitrogen content of from 14 to 21 wt %, an auxiliary material and a thermosetting resin.

DETAILED DESCRIPTION OF THE INVENTION

The carbonaceous fibers suitable for use in the present invention may be prepared by the following procedures using acrylic fibers. The acrylic fibers are derived from an acrylic polymer such as an acrylonitrile homopolymer, a copolymer, or a mixture thereof, each preferably containing at least about 85 wt % acrylonitrile.

Examples of monomer capable of polymerizing with acrylonitrile include acidic group-containing monomers such as itaconic aid, methallylsulfonic acid, allylsulfonic acid, acrylic acid, and sodium and potassium salts thereof, neutral monomers such as methyl acrylate, methyl methacrylate, vinyl chloride, vinyl acetate, hydroxyethyl methacrylate, polyoxyethylene methacrylate, and basic monomers such as vinyl pyridine, vinyl imidazole and dimethylaminoethyl acrylate. A more preferred amount of acrylonitrile in the acrylic polymer is at least about 90 wt %. An example of a preferred acrylic polymer is a copolymer containing at least about 90 wt % of acrylonitrile, about 0.5 to 2 wt % of itaconic acid and about 1 to 5 wt % of methyl acrylate. This copolymer provides carbonaceous fibers having a low thermoshrinkage. A friction material forming less cracking at a higher temperature can be obtained by using such fibers.

The acrylic fiber is oxidized in air at from about 200° to 300° C. for from about 0.1 to 4 hours under a tension of from about 1 to 300 mg/d to produce preoxidized fibers. It is preferred that a tension is applied to the fibers so that the shrinkage of the fibers during the preoxidation is from about 25 to 95%, most preferably from about 50 to 90% of the free shrinkage of the fiber. The thus-obtained preoxidized fibers are then calcinated at from about 450° to 900° C. in an inert gas such as nitrogen gas or steam for from about 0.1 to 15 minutes under a tension of from about 1 to 300 mg/d. The carbonaceous fibers used in the present invention have a bond nitrogen content of from about 14 to 21 wt %. Such fibers usually have a bond oxygen content of from about 3 to 10 wt % and a bond carbon content of from about 69 to 83 wt %, preferably from about 73 to 80 wt % (a bond atom content means a content of the atom chemically bonded in the carbon fiber).

Carbonaceous fibers which are produced by the method disclosed in U.S. Pat. No. 4,671,950 and which satisfy the requirements of the present invention can be used in the present invention.

If the nitrogen content of the carbonaceous fibers is less than about 14 wt %, the fibers cannot provide a sufficient friction coefficient to the friction material, and the carbon fibers have poor adhesion to resins. If the nitrogen content exceeds about 21 wt %, the tensile strength and the tensile modulus of elasticity of the fibers is reduced and the friction material containing such fibers has poor flexural strength and flexural modulus of elasticity. The nitrogen content is preferably from about 17 to 18 wt %.

The carbonaceous fibers used in the present invention preferably have a density of at least 1.5 g/cm$^3$, a tensile strength of from about 3 to 35 g/d, a tensile elongation of from about 1 to 5%, and a tensile modulus of elasticity of from about 200 to 1,300 g/d. Carbonaceous fibers having a nitrogen content of from about 14 to 21 wt % exhibit an electric specific resistance of from about 0.1 to 10$^7$ $\Omega$cm or insulating performance. This property, combined with low heat conductivity, makes such fibers advantageous for use in friction materials. Particularly preferred carbonaceous fibers are those which have a tensile strength of at least about 5 g/d and a tensile modulus of elasticity of from about 500 to 700 g/d. The mean diameter of the fibers is usually from about 4.0 to 10 $\mu$m, and the mean length of the fiber is preferably from about 0.01 to 6 mm and more preferably from about 0.02 to 3 mm in view of uniform dispersion of the fibers in the friction material.

In consideration of reinforcement effects and the friction coefficient, the carbonaceous fibers are incorporated in the friction material of the present invention in an amount of from about 0.5 to 29 wt % based on the total weight of the friction material. If the carbonaceous fiber content is less than about 0.5 wt %, the intended reinforcement effects are insufficient. If the fiber content exceeds about 29 wt %, it becomes difficult to properly adjust the friction coefficient.

Auxiliary materials to be incorporated in the friction material of the present invention include fibers such as aramid fibers, steel fibers, alumina fibers, alumina-silica fibers, phosphate fibers, potassium titanate fibers, copper fibers, and brass fibers. These fibers are conventionally used as reinforcements, and copper fibers and brass fibers are also used as an antiwearing agent.

The fibers generally have a mean length of from about 0.03 to 5 mm and a mean diameter of from about 5 to 20 $\mu$m. The content of fibers used as an auxiliary material is generally from about 1.0 to 20 wt % based on the total weight of the friction material.

Other suitable auxiliary materials within the scope of the present invention include calcium carbonate, alumina powder, silica powder, which are used to control the friction coefficient. The particle size of these compounds is usually from about 0.5 to 20 $\mu$m. Furthermore, other auxiliary materials that are commonly employed in known friction materials may be used.

The auxiliary materials are used in a proper amount depending on the amounts of carbonaceous fiber and the resin and characteristics thereof to obtain desired friction characteristics.

With a view to providing improved friction characteristics, aramid fibers (with trade names such as Kevlar (manufactured by Du Pont), Conex (manufactured by Teijin Co.), TWARON (manufactured by ENKA Co.), and TECHNORA (manufactured by Teijin Co.)) are preferably incorporated as auxiliary materials in an amount of from about 0.5 to 10 wt %.

In order to further improve friction characteristics, especially in decreasing wear and to obtain a higher friction coefficient, it is preferred that phosphate fibers are used in the friction material of the present invention in amounts such that the amounts of carbon fibers and phosphate fibers satisfy each of the formulae (1) to (3):

$$1.5 \leq x + y \leq 30.0 \quad (1)$$

$$0.5 \leq x \leq 29.0 \quad (2)$$

$$1.0 \leq y \leq 20.0 \quad (3)$$

wherein x represents the content of the carbonaceous fibers and y represents the content of the phosphate fibers in wt % based on the total weight of the friction material.

The phosphate fibers are made of calcium sodium metaphosphate having an approximate formula of $2CaO.Na_2O.3P_2O_5$. They usually have a specific gravity of from about 2.5 to 3.0, a tensile strength of from about 5 to 15 g/d, and modulus of elasticity of from about 300 to 700 g/d, a mean fiber diameter of from about 0.5 to 15 $\mu$m and a mean fiber length of from about 10 to 500 $\mu$m. (Detailed descriptions of suitable phosphate fibers are provided in the report of 32nd International SAMPE (The Society for the Advancement of Material and Process Engineering) Symposium (April 6–9, 1987) and U.S. Pat. No. 4,346,028.)

When the fibers are used in a friction material, they exhibit prolonged heat resistance comparable to that of asbestos.

The total of the carbonaceous fibers content (x) and the phosphate fibers content (y) is preferably within the range of from about 1.5 to 30.0 wt %. If x+y is less than about 1.5 wt %, the antiwearing properties and the anticracking properties of the friction material cannot be improved sufficiently. It is more preferred that x+y is at least about 6.0. If x+y is more than about 30 wt %, the stability of friction coefficient of the friction material cannot be improved sufficiently. It is more preferred that x+y is not more than about 25.0wt. %.

If the carbonaceous fibers content (x) is less than about 0.5 wt %, the strength of the friction material is insufficient, cracks easily form as the temperature of the friction material rises up to 500° C., and the antiwearing properties of the friction material are low. It is more preferred that x is more than about 1.0 wt %.

If the carbonaceous fibers content exceeds about 29.0 wt %, the friction coefficient of the resulting friction material cannot be adjusted to the desired level (generally from about 0.3 to 0.45). It is more preferable that x is not more than about 15 wt %.

If the phosphate fibers content (y) is less than about 1.0 wt %, the improvement in friction coefficient is low. It is more preferred that y is more than about 5.0. If y exceeds about 20.0 wt %, an unnecessarily high friction coefficient of the resulting friction material is obtained, and an improved anticracking property cannot be obtained. It is more preferred that y is not more than about 15 wt %.

Thermosetting resins suitable for use in the present invention include thermosetting resins such as a phenol resin, a melamine resin, a condensate product of a cashew nut shell liquid and an aldehyde, an epoxy resin, and modified products thereof such as a phenol-modified melamine resin and an epoxy-modified phenol resin. These thermosetting resins are usually incorporated in an amount of from about 5 to 35 wt %., preferably from about 10 to 30 wt %, based on the total weight of the friction material.

The friction material of the present invention may be produced by the following procedures: The carbonaceous fibers cut to a desired length and an auxiliary material are metered in predetermined amounts, dispersed and mixed in a mixer (preferable rotational speed is from about 1,000 to 10,000 rpm) for about 10 minutes, impregnated with a predetermined amount of a thermosetting resin, charged into a mold, and given a desired shape by heat-curing and pressure application. If desired, the shaped product may be post-cured after taking out from the mold.

Besides being cut, the carbonaceous fibers may be continuous, or in the form of staple fibers or yarns. If used in the form of yarns, the carbonaceous fibers may be blended with other fibers. In this latter case, it is preferred that a thermosetting resin, such as a phenolic resin, an epoxy resin and a melamine resin, is impregnated in blended yarns before shaping.

The friction material of the present invention does not require asbestos, so it is desirable both from the viewpoint of safety and a public health. In addition, the friction coefficient of the material is stable and the temperature dependency is small, with values of at least 0.25 being always kept. In addition, this friction material has high mechanical characteristics and provides excellent power transmitting and braking capabilities when used in automobiles or power-driven machines. Since carbonaceous fibers have excellent adhesion properties, it provides a friction material excellent in antiwearing properties and with high flexural strength.

The following specific examples are provided only for the purpose of illustrating the present invention in greater detail and are not to be construed as limiting the scope of the present invention. Unless otherwise noted, all parts, percents and ratios in the following examples are by weight.

EXAMPLE 1

Acrylic fibers made from 95 wt % acrylonitrile and 5 wt % methyl acrylate (tensile strength: 4.5 g/d; tensile modulus of elasticity: 88 g/d; mean monofilament denier: 1.5 d; total denier, $4.5 \times 10^5$) were treated in air at 240° C. under a tension of 50 mg/d for 4 hours to obtain preoxidized fibers having a tensile strength of 2 g/d, a tensile modulus of elasticity of 90 g/d, a density of 1.43 g/cm$^3$, and a bond oxygen content of 7%.

The fibers were then calcinated in a nitrogen gas atmosphere at 600° C. under a tension of 30 mg/d for 3 minutes to obtain carbonaceous fibers. The fibers had a bond nitrogen content of 19%, a bond carbon content of 70%, a tensile strength of 8 g/d, a tensile modulus of elasticity of 550 g/d, an electric specific resistance of $3 \times 10^6$ Ωcm, a mean diameter of 10 μm.

The carbonaceous fibers were cut into 3 mm mean lengths with a guillotine cutter. The cut fibers (20 parts), a calcium carbonate powder (mean particle diameter: 15 μm; 50 parts) and a phenolic resin (a phenol-formaldehyde resin having a molecular weight of about 500; 30 parts) were mixed in a Loedige mixer for 5 minutes (Loedige AG, West German). The resulting mixture was charged into a circular mold at 150° C. and heat-cured at a pressure of 15 kg/cmz for 1 hour. The cured product was taken out from the mold and subjected to further heat curing at 200° C. for 4 hours to obtain a clutch facing in an annular form having 3.5 mm thick, 130 mm in inside diameter and 200 mm in outside diameter. The performance of the clutch facing was evaluated in accordance with Japanese Industrial Standard (JIS) D 4311.

Test apparatus : dynamometer with inertia of 0.1 kgf.m/sec$^2$
Mating member for sliding: FC 25 of JIS G 5501 (gray cast iron product)
Initial sliding speed : 7 m/sec
Rotational speed : 2,000 rpm
Face pressure : 10 kgf/cmz The coefficient of friction was kept at 0.25 to 0.31 up to a surface temperature of 500° C., and the friction coefficient after 10$^4$ stops was not less than 0.25, and the total amount of wear during the test was not more than 0.2 g. These values show that the clutch facing fabricated in Example 1 was an excellent friction material. The flexural strength of this clutch facing was 5.0 kgf/mm$^2$. By observing the broken surface using an electron microscope, it was confirmed that excellent adhesiveness was obtained.

COMPARATIVE EXAMPLE 1

A clutch facing was fabricated using the preoxidized fibers prepared as an intermediate in the process described in Example 1. A clutch facing was also fabricated from carbonized fibers having a bond nitrogen content of 8% (outside the scope of the present invention), a bond carbon content of 83%, a tensile strength of 20 g/d, a tensile modulus of elasticity of 1,250 g/d and an electric specific resistance of $8 \times 10^{-3}$ Ωcm and which had been prepared by carbonizing the above-described carbonaceous fibers in a nitrogen gas atmosphere at 1,050° C. for 3 minutes under a tension of 50 mg/d.

The two comparative clutch facings were evaluated for their friction characteristics, and the following results were obtained. The clutch facing fabricated from the preoxidized fibers had friction coefficients that were within the range of from 0.3 to 0.23 up to a temperature of 500° C., however, many cracks formed in the surface of the clutch facing. The clutch facing fabricated from the carbonized fibers had a friction coefficient as low as 0.21. It was therefore clear that both comparative clutch facings were not suitable as friction materials.

COMPARATIVE EXAMPLE 2

Carbonaceous fibers with a bond nitrogen content of 23% (outside the scope of the present invention) were prepared in the same manner as in Example 1 except that the temperature of the nitrogen gas atmosphere was changed to 350° C. A clutch facing was fabricated from these fibers as in Example 1. The clutch facing was subjected to evaluation of its friction characteristics; the friction coefficient was 0.3-0.27, however, the amount of wear was 0.5 g or more. These data show the poor performance of the clutch facing as a friction material.

EXAMPLE 2

Carbonaceous fibers having a bond nitrogen content of 18%, a bond carbon content of 72%, a tensile strength of 6 g/d, a tensile modulus of elasticity of 560 g/d and an electric specific resistance of $4 \times 10^{-6}$ Ωcm were prepared in the same manner as in Example 1 except that nitrogen gas was replaced by steam. The carbonaceous fibers were cut into 1 mm mean lengths with a guillotine cutter and using these cut fibers, clutch facings were fabricated as in Example 1 except that the content of the cut fibers was changed as shown in Table 1 below.

The characteristics of these friction materials were evaluated in the same manner as in Example 1 and the results are summarized in Table 1. Table 1 clearly shows that the clutch facing containing the carbonaceous fibers in an amount within the range of the present invention provide superior characteristics as a friction material.

TABLE 1

| Carbonaceous fiber (parts) | Calcium carbonate (parts) | Phenolic resin (parts) | Friction coefficient | Amount of wear*2 (g) |
|---|---|---|---|---|
| 0.1*1 | 69.9 | 30 | broke and made measurement impossible | same |
| 10.0 | 60.0 | 30 | 0.26–0.28 | 0.18 |
| 50.0*1 | 20.0 | 30 | 0.21–0.23 | 0.10 |

(Notes)
*1 Outside the scope of the present invention
*2 Total wear amount during $10^4$ stops

EXAMPLE 3

A clutch facing was fabricated in the same manner as in Example 1 except that a pulp of carbonaceous fibers and aramid fibers (Kevlar-29) was used in a total content of 20 parts.

The characteristics of the clutch facing as a friction material were evaluated in the same manner as in Example 1 and shown in Table 2. The results show that the use of aramid fibers contributed to an improvement in the effectiveness of the clutch facing.

TABLE 2

| Content of aramid fibers (parts) | Content of carbonaceous fibers (parts) | Friction coefficient | Amount of*2 wear (g) |
|---|---|---|---|
| 0.3 | 19.7 | 0.25—0.31 | 0.16 |
| 10.0 | 10.0 | 0.28—0.33 | 0.18 |
| 19.7 | 0.3 | 0.29—0.37*3 | 0.13 |

*1 and *2: the same as in Example 2
*3: Braking was unstable due to a large fluctuation of friction coefficient.

EXAMPLE 4

Carbonaceous fibers were prepared as in Example 1 and cut into 3 mm mean lengths. Fifteen parts of these cut fibers were mixed in a Loedige mixer with 50 parts of the calcium carbonate powder and 35 parts of the phenolic resin. The mixture was charged into a mold and compressed at a pressure of 150 kgf/cm$^2$ and at 170° C. for 30 minutes to produce an automotive disk brake pad.

The pad was subjected to a constant-speed friction test (JIS D 4411); the friction coefficient at 350° C. was 0.28 and the amount of wear was $1.85 \times 10^{-7} \times$ cm$^3$/kg.m.

The braking characteristics of the pad were evaluated with a brake dynamometer. It proved to be more resistant to fade than an asbestos based pad and had reduced wear in comparison with the latter. The asbestos based pad was fabricated by processing a mixture of asbestos (25 parts), calcium carbonate (40 parts) and a phenolic resin (35 parts) in the same manner as described above.

EXAMPLE 5

Acrylic fibers made from 93 wt % acrylonitrile and 7 wt % methyl acrylate (tensile strength, 4.9 g/d; tensile elastic modulus, 88 g/d; thickness, 1.5 d; total fineness, $4.5 \times 10^5$ d) was treated in air at 245° C. under a tension of 60 mg/d for 3.5 hours to make preoxidized fibers having a tensile strength of 2.1 g/d, a tensile elastic modulus of 90 g/d, a specific gravity of 1.42, and a bond oxygen content of 8 wt %.

The fibers were then calcinated in a nitrogen gas atmosphere at 600° C. under a tension of 30 mg/d for 2.5 minutes to make carbonaceous fibers. The fibers had a bond nitrogen content of 18 wt %, a bond carbon content of 71 wt %, a tensile strength of 8.2 g/d, a tensile modulus of elasticity of 550 g/d, and an electric specific resistance of $3.6 \times 10^5$ Ωcm.

The carbonaceous fibers were cut into 3 mm lengths with a guillotine cutter. The cut fibers, phosphate fibers, calcium carbonate and a phenolic resin (the latter three materials are the same as those used in Example 1) were mixed in a Loedige mixer in amounts shown in Table 3 below. Each of the resulting mixture was charged into a circular mold at 170° C. and compressed at a pressure of 20 kgf/cm$^2$ for 30 minutes to produce a ring (outside diameter, 100 mm; inside diameter, 60 mm; thickness, 10 mm). The friction characteristics of the thus obtained rings (Samples No.1-9) were evaluated with test apparatus under the conditions set forth below, and the results obtained are shown in Table 3.

Test apparatus: dynamometer with inertia of 0.1 kgf.m/sec$^2$
Mating member: FC-25 (JIS G 5501) for sliding
Initial sliding speed : 10 m/sec
Face pressure : 20 kgf/cm$^2$

TABLE 3

| Sample No. | Carbonaceous Fiber (x) (%) | Phosphate Fiber (y) (%) | CaCO$_3$ (%) | Phenol Resin (%) | Satisfaction of Formula(*1) (1) | (2) | (3) | Friction Coefficient | Wear Amount (mg/stop) | Minimum and Maximum Torques(*2) (%) |
|---|---|---|---|---|---|---|---|---|---|---|
| 1 | 17.0 | 3.0 | 50.0 | 30.0 | O | O | O | 0.28—0.32 | 0.5 | within ±8 |
| 2 | 20.0 | 5.0 | 45.0 | 30.0 | O | O | O | 0.31—0.35 | 10 | within ±9 |
| 3 | 2.5 | 12.5 | 55.0 | 30.0 | O | O | O | 0.35—0.38 | 40 | within ±10 |
| 4 | 20.0 | 0.0 | 50.0 | 30.0 | O | O | X | 0.25—0.31 | 40 | ±more than 25(*3) |
| 5 | (0.0) | 10.0 | 60.0 | 30.0 | O | X | O | 0.38—0.40 | 150 | ±more than 25 |
| 6 | 20.0 | 10.0 | 40.0 | 30.0 | X | O | O | 0.35—0.38 | 60 | within ±10 |
| 7 | (0.3) | 25.0 | 44.7 | 30.0 | O | X | X | 0.45—0.48 | 210 | more than 25 |
| 8 | (33.0) | 0.5 | 36.5 | 30.0 | X | X |   | 0.18—0.22 | 43 | ±10 |
| 9 | (33.0) | 18.0 | 19.0 | 30.0 | X | X | O | Sample broke during | — | — |

TABLE 3-continued

| Sample No. | Carbonaceous Fiber (x) (%) | Phosphate Fiber (y) (%) | CaCO$_3$ (%) | Phenol Resin (%) | Satisfaction of Formula[*1] | | | Friction Coefficient | Wear Amount (mg/stop) | Minimum and Maximum Torques[*2] (%) |
|---|---|---|---|---|---|---|---|---|---|---|
| | | | | | (1) | (2) | (3) | | | |
| | | | | | | | | testing | | |

[*1] O: shows that the composition satisfies the corresponding formula. X: shows that the composition does not satisfy the corresponding formula.
[*2] The value of the minimum and the maximum torques with respect to the mean torque in the torque curve per stop.
[*3] When the temperature of the sample rose the friction coefficient also rose.

From Table 3 it can be seen that the friction material of the present invention (Samples 1–4 and 6) provide excellent results with respect to the friction coefficient and the wear amount, and when each amount of carbonaceous fibers, phosphate fibers and the total amount of these fibers satisfied all of formulae (1), (2) and (3) (Samples 1, 2 and 3) more excellent results, especially in the torque characteristics, can be obtained.

While the invention has been described in detail and with reference to specific embodiments thereof, it will be apparent to one skilled in the art that various changes and modifications can be made therein without departing from the spirit and scope thereof.

What is claimed is:

1. A friction material comprising from about 0.5 –29 wt % of carbonaceous fibers with a bond nitrogen content of from about 14 to 21 wt %, the remainder being an auxiliary material and a thermosetting resin.

2. The friction material as claimed in claim 1, wherein said carbonaceous fibers are obtained from acrylic fibers.

3. The friction material as claimed in claim 2, wherein said carbonaceous fibers are obtained by calcining preoxidized fibers derived from acrylic fibers, at from about 450° to 900° C. in an inert gas.

4. The friction material as claimed in claim 2, wherein said preoxidized fiber is obtained by oxidizing acrylic fibers containing at least about 85 wt % of acrylonitrile.

5. The friction material as claimed in claim 3, wherein said preoxidizing is conducted under a tension such that the shrinkage of the fibers during preoxidation is from about 25 to 95% of the free shrinkage of the fiber.

6. The friction material as claimed in claim 3, wherein said preoxidizing is conducted at from about 200° to 300° C. for about 0.1 to 4 hours under a tension of from about 1 to 300 mg/d.

7. The friction material as claimed in claim 3, wherein said calcining is conducted for about 0.1 to 15 minutes under a tension of from about 1 to 300 mg/d.

8. The friction material as claimed in claim 1, wherein said carbonaceous fibers contain bond carbon in an amount of from about 69 to 83 wt %.

9. The friction material as claimed in claim 1, wherein said carbonaceous fiber contains bond oxygen in an amount of from about 3 to 10 wt %.

10. The friction material as claimed in claim 1, wherein said carbonaceous fibers have a tensile modulus of elasticity of from about 200 to 1,300 g/d.

11. The friction material as claimed in claim 1, wherein said carbonaceous fibers have an electric specific resistance of from about 1 to $10^7$ Ωcm.

12. The friction material as claimed in claim 1, wherein said auxiliary material comprises fibers selected from the group consisting of aramid fibers, steel fibers, alumina fibers, alumina-silica fibers, phosphate fibers, potassium titanate fibers, copper fibers and brass fibers.

13. The friction material as claimed in claim 12, wherein said auxiliary material comprises aramid fibers in an amount of from about 0.5 to 10 wt % based on the total weight of the friction material.

14. The friction material as claimed in claim 1, wherein said auxiliary material comprises phosphate fibers, provided that the weight percentages of carbonaceous fibers and phosphate fibers satisfy each of formulae (1), (2) and (3):

$$1.5 \leq x+y \leq 30.0; \tag{1}$$

$$0.5 \leq x \leq 29.0; \text{ and} \tag{2}$$

$$1.0 \leq y \leq 20.0, \tag{3}$$

wherein x represents the content of the carbonaceous fibers and y represents the content of the phosphate fibers based on the total weight of the friction material.

15. The friction material as claimed in claim 1, wherein said thermosetting resin is present in an amount of from about 5 to 35 wt % based on the total weight of the friction material.

16. The friction material as claimed in claim 1, wherein said thermosetting resin is selected from the group consisting of a phenol resin, a melamine resin, a condensate product of a cashew nut shell liquid and an aldehyde, an epoxy resin, and modified products thereof.

17. The friction material as claimed in claim 1, wherein the friction coefficient of said material is from about 0.3 to 0.45.

18. A method for production of a friction material, which comprises mixing carbonaceous fibers and auxiliary material, impregnating the fibers mixture with a thermosetting resin, and molding by heat-curing, said carbonaceous fibers have a bond nitrogen content of from about 14 to 21 wt % and is incorporated in the friction material in an amount of from about 0.5 to 29 wt %.

19. The method for production of a friction material as in claim 18, wherein said carbonaceous fibers are produced by preoxidizing acrylic fibers at from about 200° to 300° C. for from about 0.1 to 4 hours in air under a tension of from about 1 to 300 mg/d, and calcining the thus obtained fibers at from about 450° to 900° C. in an inert gas under a tension of from about 1 to 300 mg/d for 0.1 to 15 minutes.

20. The method for production of a friction material as in claim 18, wherein said carbonaceous fibers contains bond carbon of from about 69 to 83 wt %.

* * * * *